A. LESPERANCE.
Rotary-Engine.

No. 216,280. Patented June 10, 1879.

Witnesses:
Fred G. Dieterich
J. R. Littell

Inventor:
Alex. Lesperance
By
C. A. Snow & Co.
Att'ys.

4 Sheets—Sheet 2.

A. LESPERANCE.
Rotary-Engine.

No. 216,280. Patented June 10, 1879.

Witnesses:
Ed. G. Dieterich
J. R. Littell

Inventor,
Alex Lesperance,
C. A. Snow & Co
Attys.

4 Sheets—Sheet 3.

A. LESPERANCE.
Rotary-Engine.

No. 216,280. Patented June 10, 1879.

Witnesses:
Fred G. Dieterich
J. R. Littell

Inventor:
Alex. Lesperance,
By C. A. Snow & Co.
Atty's.

4 Sheets—Sheet 4.
A. LESPERANCE.
Rotary-Engine.
No. 216,280. Patented June 10, 1879.
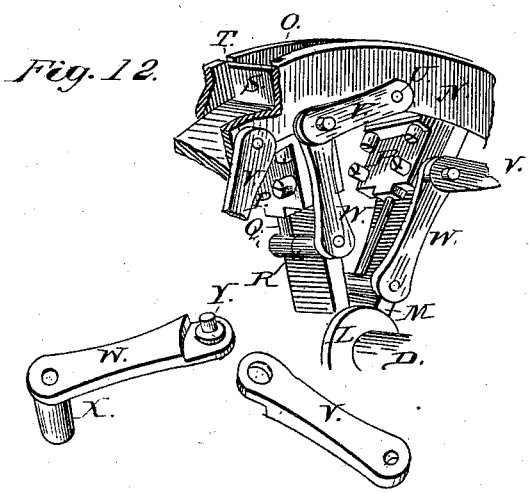
Fig. 12.
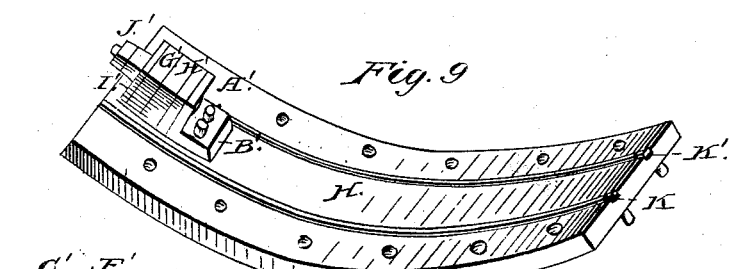
Fig. 9.
Fig. 10.
Fig. 11.
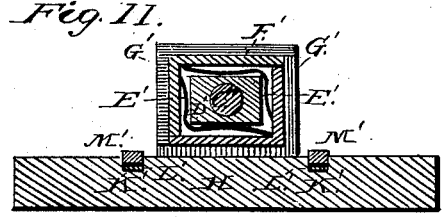
Witnesses:
Fred G. Dieterich
J. W. Littell
Inventor:
Alex. Lesperance,
by C. A. Snow & Co.
Atty's

UNITED STATES PATENT OFFICE.

ALEXANDER LESPERANCE, OF LITTLETON, NEW HAMPSHIRE.

IMPROVEMENT IN ROTARY ENGINES.

Specification forming part of Letters Patent No. 216,280, dated June 10, 1879; application filed April 14, 1879.

*To all whom it may concern:*

Be it known that I, ALEXANDER LESPERANCE, of Littleton, in the county of Grafton and State of New Hampshire, have invented certain new and useful Improvements in Rotary Engines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
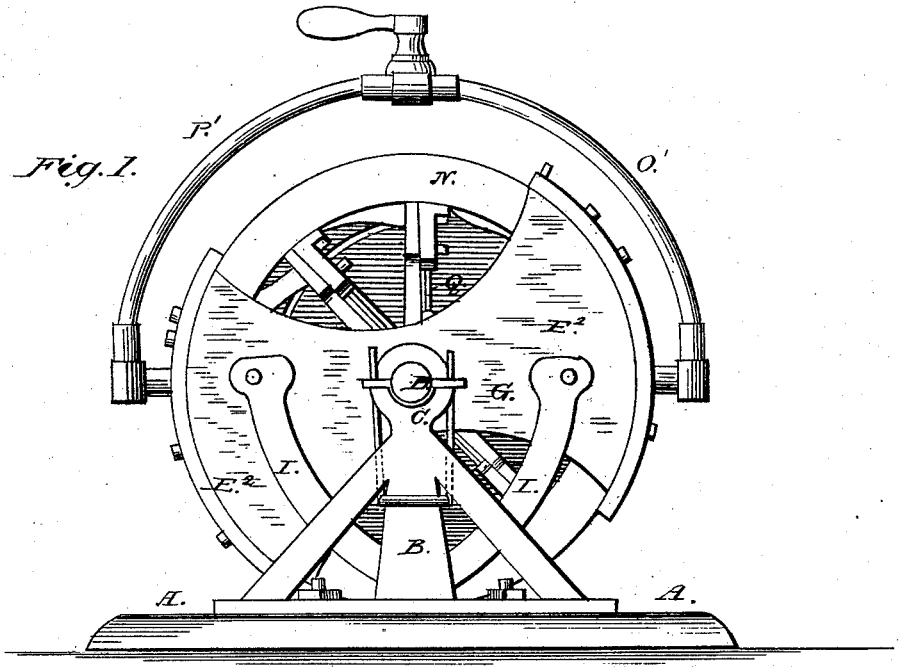
Figure 2:
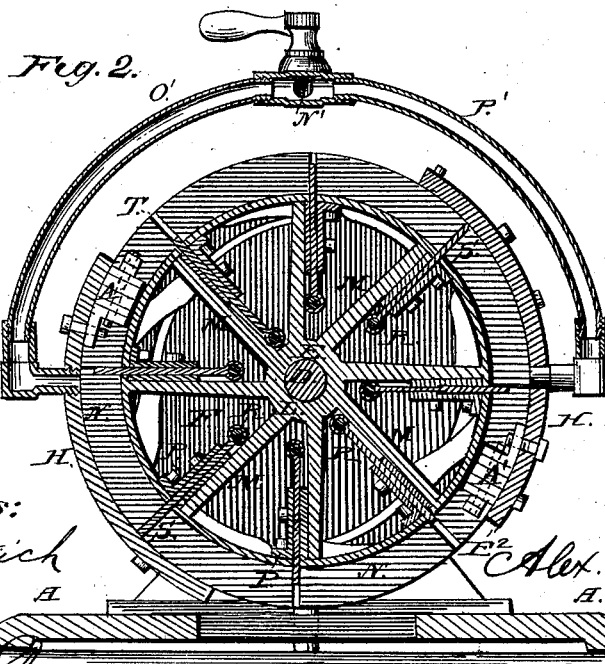
Figure 4:
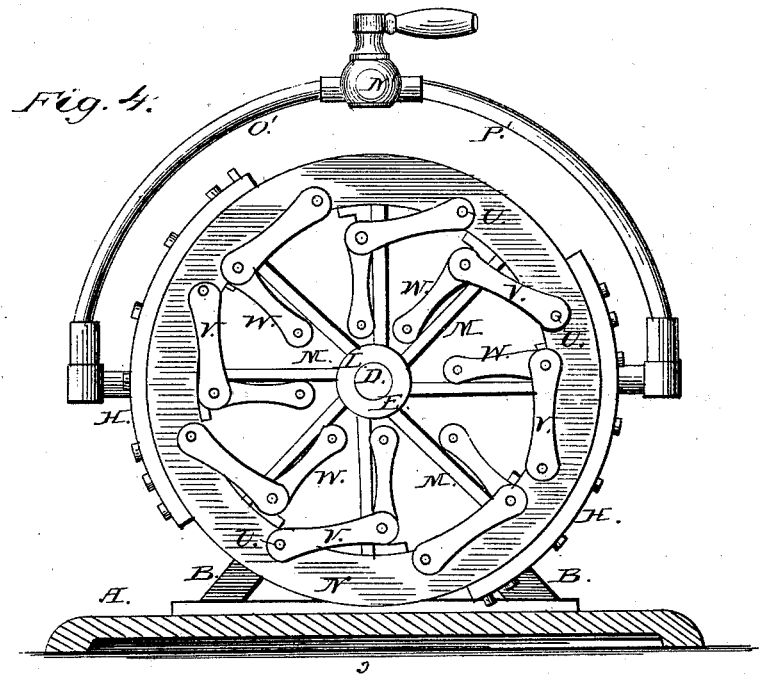
Figure 3:
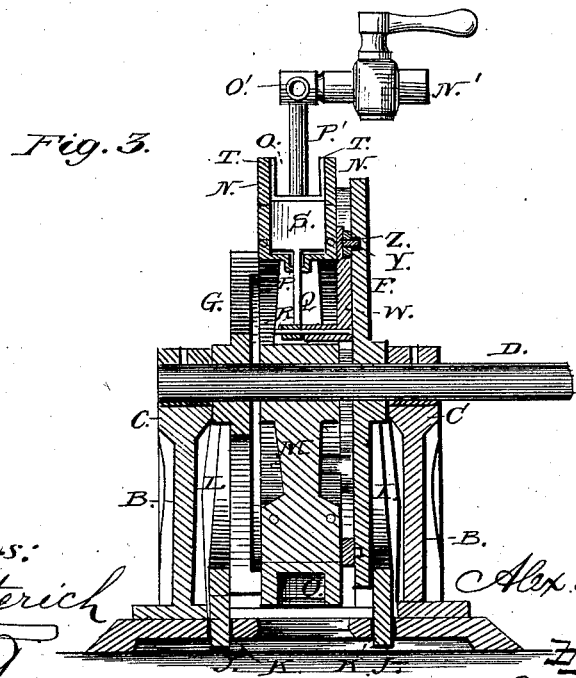
Figure 5:
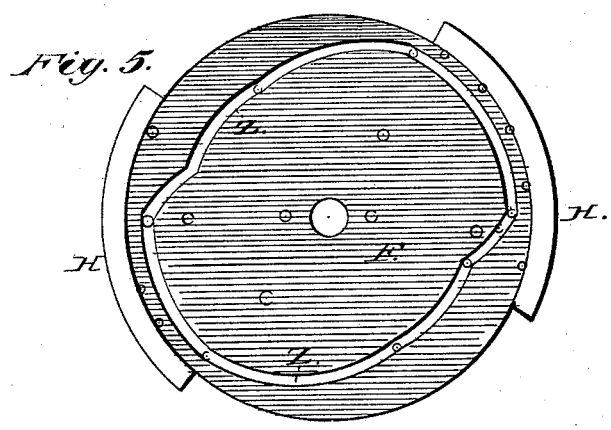
Figure 6:
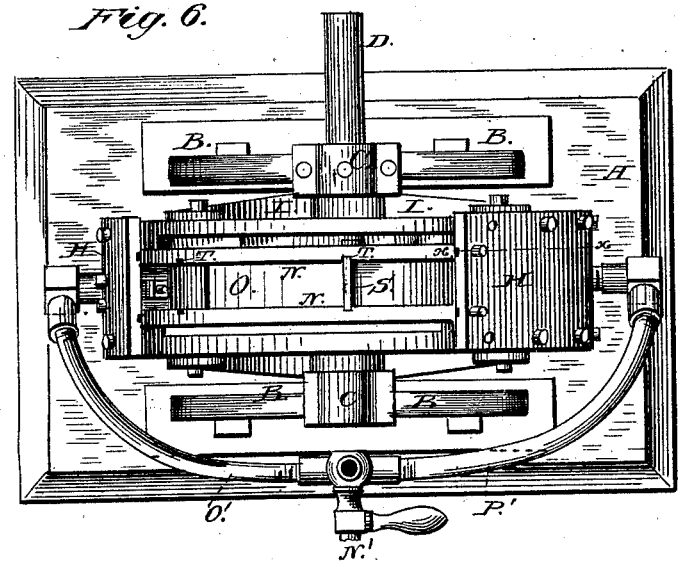
Figures 7, 8:
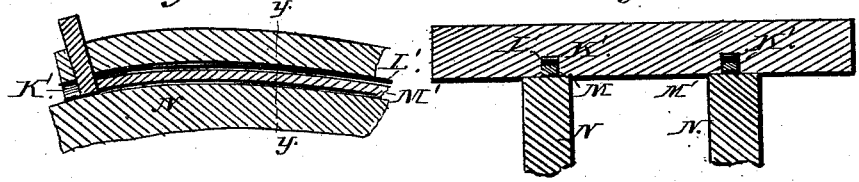

Figure 1 is a side view. Fig. 2 is a longitudinal vertical section. Fig. 3 is a transverse vertical section. Fig. 4 is a rear view, the covering-plate having been removed. Fig. 5 is a view of the rear covering-plate, showing the cam-groove. Fig. 6 is a top view. Fig. 7 is a section on line $x\, x$, Fig. 6. Fig. 8 is a section on line $y\, y$, Fig. 7. Fig. 9 is a view, in perspective, of one of the segment-plates of the outer case, showing the stationary abutment. Fig. 10 is a longitudinal section of said abutment. Fig. 11 is a cross-section of the same; and Fig. 12 is a detail view, in perspective, of one of the piston-plates with its operating mechanism.

Corresponding parts in the several figures are denoted by like letters of reference.

This invention relates to rotary engines; and it consists in certain improvements in the construction of the same, which will be hereinafter fully described, and particularly pointed out in the claims.

In the drawings hereto annexed, A represents the foundation, having uprights B B, with boxes or bearings C C for the axle D of the rotary disk or hub E of the steam-engine. Said disk or hub is inclosed in a casing, $E^2$, formed of two plates, F G, connected by segmental curved plates H H. This casing is provided with brackets I I, having downwardly-projecting arms J J, which slide in suitable openings or perforations K K in the foundation A. The plates F G are of course provided with suitable openings or bearings for the ends of the shaft or axle D.

The disk E consists of a central plate or hub, L, having radiating arms M, which connect it with the rim N. The latter is provided with a circumferential recess, O.

Upon the arms M are secured boxes P P, having bearings for the rods Q Q, which are provided at their inner ends with transverse pins R R. At their outer ends they carry the piston-plates S S, which slide in slots in the rim N, and are guided by grooves T T in the sides of the recess O.

The rear side of the rim N is provided with studs U, upon which are pivoted arms or levers V, to the ends of which arms W are pivoted. The free or extreme ends of the latter have sockets X to receive the transverse pins R of the rods Q.

The pivoted ends of the arms W are provided with studs Y, which slide in the cam-groove Z in the inner face of the rear plate, F, said cam-groove being of the configuration shown in Fig. 5—in other words, it is such that in each complete revolution of the engine the piston-plates, by the mechanism just described, are made to advance and recede twice.

The curved plates H H, which form part of the casing, are provided with the stationary abutments A' A', which are located on diametrically-opposite sides of the engine. Each of these abutments consists of a plate, B', firmly secured to the inner side of the curved plate, and provided with a bolt, C', upon which is adjusted a plate, D', the edges of which are grooved, so as to retain two angular springs, $E^1$, which bear against two angular plates, F', fitted together around plate D'. The plates F' are surrounded by other angular plates G' H', and all are kept in place by a flat plate, I', adjusted upon bolt C', and secured by a nut, J'.

It will be seen that the springs $E^1$ press against the surrounding plates, forcing them outward against the inner side of the curved plate H and against the sides and bottom of the groove or recess O, into which the abutment is fitted, thus effecting a thoroughly packed and steam-tight joint.

The curved plates H are provided upon their inner sides with grooves or recesses K', registering with the edges of rim N. In these grooves I place flat springs L', the tension of which is exerted outwardly against packing-rods M', fitted in said grooves above the springs. The rods M', being thus forced against the edges of rim N, effect a steam-tight joint.

The steam-pipe N' has two branches, O' P', which are connected to the curved plates H H, as shown, the openings being at the inner ends of the abutments. By this arrangement the pressure upon the main shaft of the engine and the friction resulting therefrom is considerably diminished.

It will thus be seen that in operation the steam enters the recess in the rim of the rotating disk on opposite sides, the steam-chambers being formed by the sides and bottoms of said recess, the stationary abutments, and the curved plates H.

It has been already stated that the cam-groove Z is so shaped as to cause the piston-plates, through the intermediate operating mechanism, to advance and recede twice during each revolution of the engine. It should be added that the piston-plates recede immediately after passing each of the curved plates H, and do not advance until the abutment and steam-entrance of the next plate has been passed. They then advance until they come in contact with the plate, thus closing the steam-chamber, when the pressure of the steam upon said piston-plates causes the operation of the engine. Suitable exhaust-pipes may, of course, be provided.

Having thus described my invention, I claim and desire to secure by Letters Patent of the United States—

1. In a rotary engine, the casing $E^2$, having brackets I I, provided with downwardly-projecting arms J J, in combination with the foundation A, having openings K K and uprights B B, and the rotary disk E, when arranged as herein described, for the purpose set forth.

2. In a rotary engine, the pistons S, arranged as herein described, and having rods Q, provided with transverse pins R, in combination with the pivoted levers V, having pivoted arms W, provided with sockets X and studs Y, and the cam-groove disk or plate F, substantially as and for the purpose set forth.

3. In a rotary engine, the combination of the plates F G and curved plates H H, having grooves K', with the springs L', packing-rods M', and the rotary disk E, substantially as and for the purpose set forth.

4. In a rotary engine, the abutments A', consisting, essentially, of the plates B', having bolts C', recessed plates D', springs $E^1$, and angular plates F' G' H', and a binding plate and nut, substantially as and for the purpose set forth.

5. In a rotary engine, the combination, with the rotary disk E, having annular groove O, of the abutments A', constructed as herein described, for the purpose set forth.

In testimony that I claim the foregoing I have hereunto set my hand and seal this 27th day of March, 1879.

ALEXANDER LESPERANCE. [L. S.]

Witnesses:
    A. S. BATCHELLOR,
    CHAS. W. BELHS.